United States Patent
Lo

(10) Patent No.: US 8,520,746 B2
(45) Date of Patent: *Aug. 27, 2013

(54) MAXIMUM RATIO TRANSMISSION

(75) Inventor: Titus Lo, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 186 days.

This patent is subject to a terminal disclaimer.

(21) Appl. No.: 12/561,571

(22) Filed: Sep. 17, 2009

(65) Prior Publication Data

US 2010/0002798 A1    Jan. 7, 2010

Related U.S. Application Data

(63) Continuation of application No. 12/034,771, filed on Feb. 21, 2008, now Pat. No. 7,609,771, which is a continuation of application No. 11/766,853, filed on Jun. 22, 2007, now Pat. No. 7,362,823, which is a continuation of application No. 10/963,838, filed on Oct. 12, 2004, now Pat. No. 7,274,752, which is a continuation of application No. 10/177,461, filed on Jun. 19, 2002, now Pat. No. 6,826,236, which is a continuation of application No. 09/156,066, filed on Sep. 17, 1998, now Pat. No. 6,459,740.

(51) Int. Cl.
    *H04L 27/00* (2006.01)

(52) U.S. Cl.
    USPC ............ 375/259; 375/299; 375/267; 375/347

(58) Field of Classification Search
    USPC .................... 375/299, 267, 259–260, 347
    See application file for complete search history.

(56) References Cited

U.S. PATENT DOCUMENTS 3,633,107 A    1/1972  Brady (Continued)

FOREIGN PATENT DOCUMENTS

CA    2276207    3/1998

(Continued)

OTHER PUBLICATIONS

Alamouti, S. M., "Trellis-Coded Modulation and Transmit Diversity: Design Criteria and Performance Evaluation," 0-7803-5106-1/98, pp. 703-708, 1998 IEEE.

(Continued)

*Primary Examiner* — Jean B Corrielus
(74) *Attorney, Agent, or Firm* — Abel Law Group, LLP

(57) ABSTRACT

An arrangement where a transmitter has a plurality of transmitting antennas that concurrently transmit the same symbol, and where the signal delivered to each transmitting antenna is weighted by a factor that is related to the channel transmission coefficients found between the transmitting antenna and receiving antennas. In the case of a plurality of transmit antennas and one receive antenna, where the channel coefficient between the receive antenna and a transmit antenna i is $h_i$, the weighting factor is $h^*_i$ divided by a normalizing factor, a, which is $$\left(\sum_{k=1}^{K} |h_k|^2\right)^{1/2},$$

where K is the number of transmitting antennas. When more than one receiving antenna is employed, the weighting factor is $$\frac{1}{a}(gH)^H,$$

where $g=[g_1 \ldots g_L]$, H is a matrix of channel coefficients, and $\alpha$ is a normalizing factor $$\left(\sum_{p=1}^{L}\sum_{q=1}^{L}\left|\sum_{k=1}^{K} h_{pk} h^*_{qk}\right|\right)^{1/2}.$$

8 Claims, 3 Drawing Sheets

(56) References Cited

U.S. PATENT DOCUMENTS

| | | | |
|---|---|---|---|
| 3,978,408 A | 8/1976 | Gupta et al. | |
| 4,001,692 A | 1/1977 | Fenwick | |
| 4,099,121 A | 7/1978 | Fang | |
| 4,369,516 A | 1/1983 | Byrns | |
| 4,567,464 A | 1/1986 | Siegel | |
| 4,577,332 A | 3/1986 | Brenig | |
| 4,675,880 A | 6/1987 | Davarian | |
| 4,733,402 A | 3/1988 | Monsen | |
| 4,763,331 A | 8/1988 | Matsumoto | |
| 4,953,183 A | 8/1990 | Bergmans et al. | |
| 5,022,053 A | 6/1991 | Chung et al. | |
| 5,029,185 A | 7/1991 | Wei | |
| 5,088,113 A | 2/1992 | Wei | |
| 5,101,501 A | 3/1992 | Gilhousen et al. | |
| 5,109,390 A | 4/1992 | Gilhousen et al. | |
| 5,140,615 A | 8/1992 | Jasper et al. | |
| 5,170,413 A | 12/1992 | Hess | |
| 5,202,903 A | 4/1993 | Okanone | |
| 5,283,780 A | 2/1994 | Schuchman et al. | |
| 5,305,353 A | 4/1994 | Weerackody | |
| 5,319,677 A | 6/1994 | Kim | |
| 5,369,412 A | 11/1994 | Tsujimoto | |
| 5,396,518 A | 3/1995 | How | |
| 5,416,797 A | 5/1995 | Gilhousen | |
| 5,418,798 A | 5/1995 | Wei | |
| 5,442,627 A | 8/1995 | Viterbi et al. | |
| 5,457,712 A | 10/1995 | Weerackody | |
| 5,461,646 A | 10/1995 | Anvari | |
| 5,461,696 A | 10/1995 | Frank et al. | |
| 5,479,448 A | 12/1995 | Seshadri | |
| 5,481,572 A | 1/1996 | Skold et al. | |
| 5,487,091 A | 1/1996 | Jasper et al. | |
| 5,499,272 A | 3/1996 | Bottomley | |
| 5,553,102 A | 9/1996 | Jasper et al. | |
| 5,613,219 A | 3/1997 | Vogel et al. | |
| 5,675,590 A | 10/1997 | Alamouti et al. | |
| 5,752,173 A | 5/1998 | Tsujimoto | |
| 5,781,845 A | 7/1998 | Dybdal et al. | |
| 5,787,131 A | 7/1998 | Bottomley | |
| 5,790,570 A | 8/1998 | Heegard et al. | |
| 5,819,168 A | 10/1998 | Golden et al. | |
| 5,819,169 A | 10/1998 | Fudem | |
| 5,838,742 A | 11/1998 | Abu-Dayya | |
| 5,848,103 A | 12/1998 | Weerackody | |
| 5,859,870 A | 1/1999 | Tsujimoto | |
| 5,924,034 A | 7/1999 | Dupuy | |
| 5,933,421 A | 8/1999 | Alamouti et al. | |
| 5,943,372 A | 8/1999 | Gans et al. | |
| 5,949,833 A | 9/1999 | Weerackody | |
| 5,960,039 A | 9/1999 | Martin et al. | |
| 5,966,095 A | 10/1999 | Hiramatsu et al. | |
| 5,991,273 A * | 11/1999 | Abu-Dayya | 370/252 |
| 5,991,331 A | 11/1999 | Chennakeshu et al. | |
| 5,999,826 A | 12/1999 | Whinnett | |
| 6,031,474 A | 2/2000 | Kay et al. | |
| 6,034,987 A | 3/2000 | Chennakeshu et al. | |
| 6,038,263 A | 3/2000 | Kotzin et al. | |
| 6,038,272 A | 3/2000 | Golden et al. | |
| 6,044,120 A | 3/2000 | Bar-David et al. | |
| 6,052,085 A | 4/2000 | Hanson et al. | |
| 6,067,324 A | 5/2000 | Harrison | |
| 6,087,986 A * | 7/2000 | Shoki et al. | 342/383 |
| 6,088,408 A | 7/2000 | Calderbank et al. | |
| 6,094,465 A | 7/2000 | Stein | |
| 6,097,771 A | 8/2000 | Foschini | |
| 6,101,399 A | 8/2000 | Raleigh et al. | |
| 6,115,427 A | 9/2000 | Calderbank | |
| 6,144,711 A | 11/2000 | Raleigh et al. | |
| 6,144,771 A | 11/2000 | Li et al. | |
| 6,154,485 A | 11/2000 | Harrison | |
| 6,173,005 B1 | 1/2001 | Kotzin | |
| 6,178,196 B1 | 1/2001 | Naguib et al. | |
| 6,185,258 B1 | 2/2001 | Alamouti et al. | |
| 6,185,266 B1 | 2/2001 | Kuchi et al. | |
| 6,188,736 B1 | 2/2001 | Lo et al. | |
| 6,192,256 B1 | 2/2001 | Whinnett | |
| 6,201,799 B1 | 3/2001 | Huang et al. | |
| 6,201,955 B1 * | 3/2001 | Jasper et al. | 455/277.2 |
| 6,298,082 B1 | 10/2001 | Harrison | |
| 6,304,581 B1 | 10/2001 | Chen et al. | |
| 6,307,851 B1 | 10/2001 | Jung et al. | |
| 6,317,411 B1 | 11/2001 | Whinnett et al. | |
| 6,317,466 B1 | 11/2001 | Foschini et al. | |
| 6,327,299 B1 | 12/2001 | Meszko | |
| 6,377,631 B1 | 4/2002 | Raleigh | |
| 6,377,812 B1 * | 4/2002 | Rashid-Farrokhi et al. | 455/522 |
| 6,393,074 B1 | 5/2002 | Mandyam et al. | |
| 6,411,257 B1 | 6/2002 | Sorelius et al. | |
| 6,411,612 B1 | 6/2002 | Halford et al. | |
| 6,415,163 B1 * | 7/2002 | Keskitalo et al. | 455/562.1 |
| 6,430,231 B1 | 8/2002 | Calderbank et al. | |
| 6,452,981 B1 | 9/2002 | Raleigh et al. | |
| 6,459,740 B1 | 10/2002 | Lo | |
| 6,470,043 B1 | 10/2002 | Lo et al. | |
| 6,501,803 B1 | 12/2002 | Alamouti et al. | |
| 6,542,556 B1 | 4/2003 | Kuchi et al. | |
| 6,549,585 B2 | 4/2003 | Naguib et al. | |
| 6,728,307 B1 | 4/2004 | Derryberry et al. | |
| 6,741,635 B2 | 5/2004 | Lo et al. | |
| 6,775,329 B2 | 8/2004 | Alamouti et al. | |
| 6,807,240 B2 | 10/2004 | Alamouti et al. | |
| 6,826,236 B2 | 11/2004 | Lo | |
| 6,853,688 B2 | 2/2005 | Alamouti et al. | |
| 7,145,971 B2 | 12/2006 | Raleigh et al. | |
| 7,274,752 B2 | 9/2007 | Lo | |
| 7,362,823 B2 | 4/2008 | Lo | |
| 8,009,780 B2 * | 8/2011 | Ko et al. | 375/346 |
| 2004/0157646 A1 | 8/2004 | Raleigh et al. | |
| 2005/0157810 A1 | 7/2005 | Raleigh et al. | |
| 2005/0195915 A1 * | 9/2005 | Raleigh et al. | 375/267 |

FOREIGN PATENT DOCUMENTS

| | | |
|---|---|---|
| CA | 2302289 | 3/1998 |
| DE | 29824760 | 6/2002 |
| DE | 29824761 | 6/2002 |
| DE | 29824762 | 6/2002 |
| DE | 29824763 | 6/2002 |
| DE | 29824765 | 6/2002 |
| EP | 767546 | 4/1997 |
| EP | 1016228 | 7/2000 |
| GB | 2237706 | 8/1991 |
| GB | 2280575 | 1/1995 |
| GB | 2290010 | 6/1995 |
| GB | 2311445 | 9/1997 |
| JP | 63-286027 | 11/1988 |
| WO | WO 91/20142 | 12/1991 |
| WO | WO 95/22214 | 8/1995 |
| WO | WO 97/24849 | 7/1997 |
| WO | WO 98/09385 | 3/1998 |
| WO | WO 99/23766 | 5/1999 |
| WO | WO 00/11806 | 3/2000 |
| WO | WO 00/18056 | 3/2000 |
| WO | WO 00/49780 | 8/2000 |
| WO | WO 00/51265 | 8/2000 |
| WO | WO 01/19013 | 3/2001 |
| WO | WO 01/63826 | 3/2001 |
| WO | WO 01/54305 | 7/2001 |
| WO | WO 01/56218 | 8/2001 |
| WO | WO 01/69814 | 9/2001 |

OTHER PUBLICATIONS

Alamouti, Siavash M., "A Simple Transmit Diversity Technique for Wireless Communications," IEEE Journal on Select Areas in Communications, Oct. 1998, pp. 1451-1458, vol. 16, No. 8, The Institute of Electrical and Electronics Engineers, Inc., New York, NY.

Blanco, M.A. & Zdunek, K., "Performance and Optimization of Switched Diversity Systems for the Detection of Signals with Rayleigh Fading," IEEE Transactions on Communications, 27(12):1887-1895, (Dec. 1979).

Blanco, M.A. & Zdunek, K., "On the Optimization of Simple Switched Diversity Receivers," 1978 IEEE Conference on Communications and Power, Montreal, Canada, pp. 114-117, (1978).

Calderbank, A. et al., "Space-Time Codes for Wireless Communication," 1997 IEEE, ISIT 1997, Jun. 29-Jul. 4, pp. 146, Ulm, Germany.

Cavers, James K., "An Analysis of Pilot Symbol Assisted Modulation for Rayleigh Fading Channels," IEEE Transactions on Vehicular Technology, Nov. 1991, pp. 686-693, vol. 40, No. 4, The Institute of Electrical and Electronics Engineers, Inc., New York, NY.

Foschini, G.J. and Gans, M.J., "On Limits of Wireless Communications in a Fading Environment when Using Multiple Antennas," Wireless Personal Communications 6:311-335, (1998).

Foschini, G.J., "Layered Space-Time Architecture for Wireless Communication in a Fading Environment when Using Multi-Element Antennas", Bell Technical Labs Journal, 1996, pp. 41-59.

Hinderling, J. et al., "CDMA Mobile Station Modem ASIC," IEEE 1992 Custom Integrated Circuits Conference pp. 10.2.1-10.2.5, (1992).

Hiroike, A. et al., "Combined Effects of Phase Sweeping Transmitter Diversity and Channel Coding," IEEE Transactions on Vehicular Technology, vol. 41, No. 2, May 1992, The Institute of Electrical and Electronics Engineers, Inc., New York, NY.

Kerr, R. et al., "The CDMA Digital Cellular System: An ASIC Overview," IEEE 1992 Custom Integrated Circuits Conference pp. 10.1.1-10.1.7, (1992).

Naguib, A. F. et al., "Space-Time Coded Modulation for High Data Rate Wireless Communications," 1997 EEE, pp. 102-109, 0-7803-4198-8/97, The Institute of Electrical and Electronics Engineers, Inc., New York, NY.

Naguib, Ayman et al., "A Space-Time Coding Modem for High-Data-Rate Wireless Communications," IEEE Journal on Selected Areas in Communications, Oct. 1998, pp. 1459-1478, The Institute of Electrical and Electronics Engineers, Inc., New York, NY.

Pickholtz, R.L. et al., "Theory of Spread Spectrum Communications-A Tutorial," IEEE Transactions on Communications, 30(5):855-884, (1982).

Sampei, Seiichi et al., "Rayleigh Fading Compensation Method for 16QAM in Digital Land Mobile Radio Channels," Proceeding of the 1989 IEEE Vehicular Technology Conference, May 1989, pp. 640-646, The Institute of Electrical and Electronics Engineers, Inc., New York, NY.

Seshadri, N. et al., "Advanced Techniques for Modulation, Error Correction, Channel Equalization and Diversity," AT&T Tech. Journal 47(4): 48-63, Jul. 1993.

Seshadri, N. et al., "Space-Time Codes for Wireless Communication: Code Construction," IEEE 47th Vehicular Technology Conf., Phoenix, pp. 637-641, May 1997.

Seshadri, N. et al., "Two Signaling Schemes for Improving the Error Performance of FDD Transmission Systems Using Transmitter Antenna Diversity," Proceeding of the 1993 IEEE Vehicular Technology Conference (VTC 43rd), May 1993, pp. 508-511, The Institute of Electrical and Electronics Engineers, Inc., New York, NY.

Tarokh, V. et al., "Space Time Codes for High Data Rate Wireless Communication: Performance Criteria in the Presence of Channel Estimation Errors, Mobility, and Multiple Paths", IEEE Transactions on Communications 47 (2):199-207, (1999).

Tarokh, V., et al., "Space-Time Codes for High Data Rate Wireless Communication: Performance Criteria," IEEE International Conference on Communications, Montreal, 1:299-303, Jun. 1997.

Tarokh, Vahid et al., "Combined Array Processing and Space-Time Coding," IEEE Transactions on Information Theory, May 1999, pp. 1121-1128, vol. 45, No. 4, The Institute of Electrical and Electronics Engineers, Inc., New York, NY.

Tarokh, Vahid et al., "Space-Time Codes for High Data Rate Wireless Communication: Performance Criterion and Code Construction," IEEE Transactions on Information Theory, Mar. 1998, pp. 744-765, vol. 44, No. 2, The Institute of Electrical and Electronics Engineers, Inc., New York, NY.

Ungerboeck, Gottfried, "Channel Coding with Multilevel/Phase Signals," IEEE Transactions on Information Theory, Jan. 1982, pp. 55-67, vol. IT-28, No. 1, The Institute of Electrical and Electronics Engineers, Inc., New York, NY.

Weerackody, V., "Diversity for the Direct-Sequence Spread Spectrum System Using Multiple Transmit Antennas," Proceedings of the IEEE International conference on Communications, May 23-26, 1993, Geneva, vol. 3, pp. 1775-1779.

Winters, J.H., "The Diversity Gain of Transmit Diversity in Wireless Systems with Rayleigh Fading," 1998 IEEE, pp. 119-123.

Winters, Jack J., "The Diversity Gain of Transmit Diversity in Wireless Systems with Rayleigh Fading," IEEE International Conference on Communications, May 1-5, 1994, New Orleans, Louisiana.

Winters, J.H., Salz, J., Gitlin, R.D., "The Impact of Antenna Diversity on the Capacity of Wireless Communications Systems," IEEE Transactions on Communications, vol. 42, No. 2, Feb./Mar./Apr. 1994, pp. 1740-1751, IEEE Communications Society, New York, NY.

Wittneben, A., "A New Bandwidth Efficient Transmit Antenna Modulation Diversity Scheme for Linear Digital Modulation," Proceeding of the 1993 IEEE International Conference on Communications (IICC '93), May 1993, pp. 1630-1634, The Institute of Electrical and Electronics Engineers, Inc., New York, NY.

Wittneben, Armin, "A New Bandwidth Efficient Transmit Antenna Modulation Diversity Scheme for Linear Digital Modulation," IEEE International Conference on Communications, May 23-26, 1993, Geneva, Switzerland.

Wittneben, A., (A New bandwidth Efficient Transmit Antena Madulation Diversity Scheme for Linear Digital Modulation, IEEE 1993, pp. 1630-1634).

Wittneben, A., "Basestation modulation diversity for digital SIMULCAST," Proceeding of the 1991 IEEE Vehicular Technology Conference, May 1991, pp. 848-853, The Institute of Electrical and Electronics Engineers, Inc., New York, NY.

Wittneben, A., "Basestation modulation diversity for digital SIMULCAST," 41.sup.st IEEE Vehicular Technology Conference, May 19-22, 1991, St. Louis, Mo.

Wittneben, A., (Basestation modulation diversity for digital SIMULCAST, IEEE 1991,pp. 848-853).

* cited by examiner

MAXIMUM RATIO TRANSMISSION

CROSS-REFERENCE TO RELATED APPLICATIONS

This application is a continuation of U.S. patent application Ser. No. 12/034,771, filed Feb. 21, 2008, now U.S. Pat. No. 7,609,771, issued on Oct. 27, 2009, entitled "Maximum Ratio Transmission," naming inventor Titus Lo, which application is a continuation of U.S. patent application Ser. No. 11/766,853, filed Jun. 22, 2007, now U.S. Pat. No. 7,362,823, issued on Apr. 22, 2008, which is a continuation of U.S. patent application Ser. No. 10/963,838 filed on Oct. 12, 2004, now U.S. Pat. No. 7,274,752, issued on Sep. 25, 2007, which is a continuation of U.S. patent application Ser. No. 10/177,461 filed on Jun. 19, 2002, now U.S. Pat. No. 6,826,236, issued on Nov. 30, 2004, which is a continuation of U.S. patent application Ser. No. 09/156,066 filed on Sep. 17, 1998, now U.S. Pat. No. 6,459,740, issued on Oct. 1, 2002, each of which is incorporated by reference in their entirety herein.

FIELD OF ART

Aspects described herein relate to a system and method for using transmit diversity in a wireless communications setting.

BACKGROUND OF THE INVENTION

Wireless communications services are provided in different forms. For example, in satellite mobile communications, communications links are provided by satellite to mobile users. In land mobile communications, communications channels are provided by base stations to the mobile users. In PCS, communications are carried out in microcell or picocell environments, including outdoors and indoors. Regardless the forms they are in, wireless telecommunication services are provided through radio links, where information such as voice and data is transmitted via modulated electromagnetic waves. That is, regardless of their forms, all wireless communications services are subjected to vagaries of the propagation environments.

The most adverse propagation effect from which wireless communications systems suffer is the multipath fading. Multipath fading, which is usually caused by the destructive superposition of multipath signals reflected from various types of objects in the propagation environments, creates errors in digital transmission. One of the common methods used by wireless communications engineers to combat multipath fading is the antenna diversity technique, where two or more antennas at the receiver and/or transmitter are so separated in space or polarization that their fading envelopes are decorrelated. If the probability of the signal at one antenna being below a certain level is p (the outage probability), then the probability of the signals from L identical antennas all being below that level is $p^L$. Thus, since p<1, combining the signals from several antennas reduces the outage probability of the system. The essential condition for antenna diversity schemes to be effective is that sufficient de-correlation of the fading envelopes be attained.

A classical combining technique is the maximum-ratio combining (MRC) where the signals from received antenna elements are weighted such that the signal-to-noise ratio (SNR) of their sum is maximized. The MRC technique has been shown to be optimum if diversity branch signals are mutually uncorrelated and follow a Rayleigh distribution. However, the MRC technique has so far been used exclusively for receiving applications. As there are more and more emerging wireless services, more and more applications may require diversity at the transmitter or at both transmitter and receiver to combat severe fading effects. As a result, the interest in transmit diversity has gradually been intensified. Various transmit diversity techniques have been proposed but these transmit diversity techniques were built on objectives other than to maximize the SNR. Consequently, they are sub-optimum in terms of SNR performance.

SUMMARY OF THE INVENTION

Improved performance is achieved with an arrangement where the transmitter has a plurality of transmitting antennas that concurrently transmit the same symbol, and where the signal delivered to each transmitting antenna is weighted by a factor that is related to the channel transmission coefficients found between the transmitting antenna and receiving antenna(s). In the case of a plurality of transmit antennas and one receive antenna, where the channel coefficient between the receive antenna and a transmit antenna i is $h_i$, the weighting factor is $h_i^*$ divided by a normalizing factor, a, which is $$a = \left(\sum_{k=1}^{K} |h_k|^2\right)^{1/2},$$

where K is the number of transmitting antennas. When more than one receiving antenna is employed, the weighting factor is $$\frac{1}{a}(gH)^H,$$

where $g=[g_1 \ldots g_L]$, H is a matrix of channel coefficients, and a is a normalizing factor $$\left(\sum_{p=1}^{L}\sum_{q=1}^{L}\left|\sum_{k=1}^{K} h_{pk} h_{qk}^*\right|\right)^{1/2}.$$

DETAILED DESCRIPTION

Figure 1:
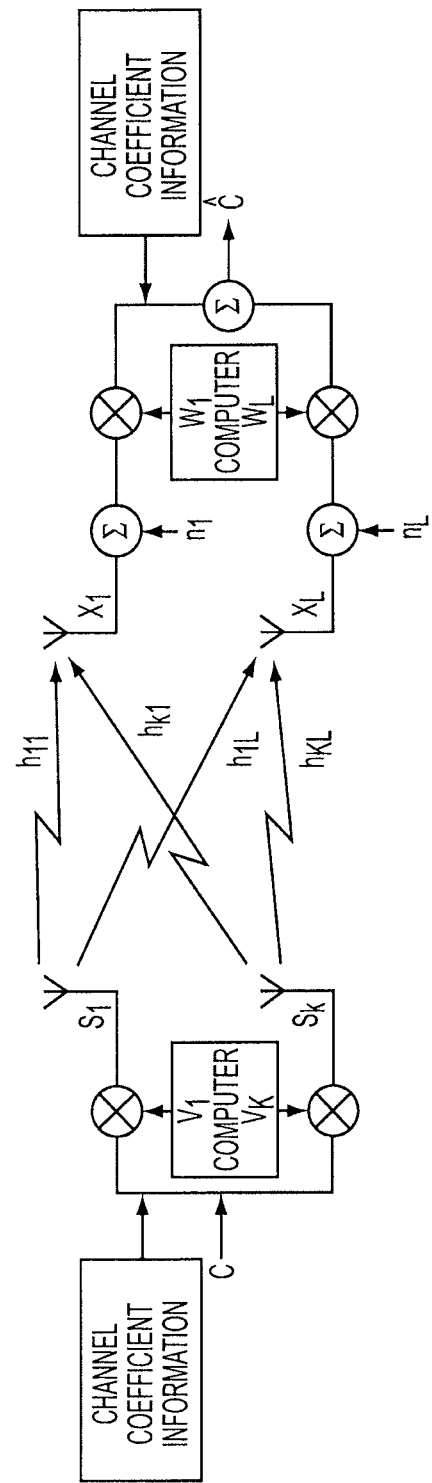
FIG. 1 illustrates an arrangement where there is both transmit and receive diversity.

FIG. 1 depicts a system which comprises K antennas for transmission and L antennas for reception. The channel between the transmit antennas and the receive antennas can be modeled by K×L statistically-independent coefficients, as show in FIG. 1. It can conveniently be represented in matrix notation by $$H = \begin{pmatrix} h_{11} & \cdots & h_{1K} \\ \vdots & \ddots & \vdots \\ h_{L1} & \cdots & h_{LK} \end{pmatrix} = \begin{pmatrix} h_1 \\ \vdots \\ h_L \end{pmatrix} \quad (1)$$

where the entry $h_{pk}$ represents the coefficient for the channel between transmit antenna k and receiver antenna p. It is assumed that the channel coefficients are available to both the transmitter and receiver through some means, such as through a training session that employs pilot signals sent individually through each transmitting antenna (see block 202 of FIG. 2 and block 302 of FIG. 3). Since obtaining these coefficients is well known and does not form a part of this invention additional exposition of the process of obtaining the coefficients is deemed not necessary.

Figure 2:
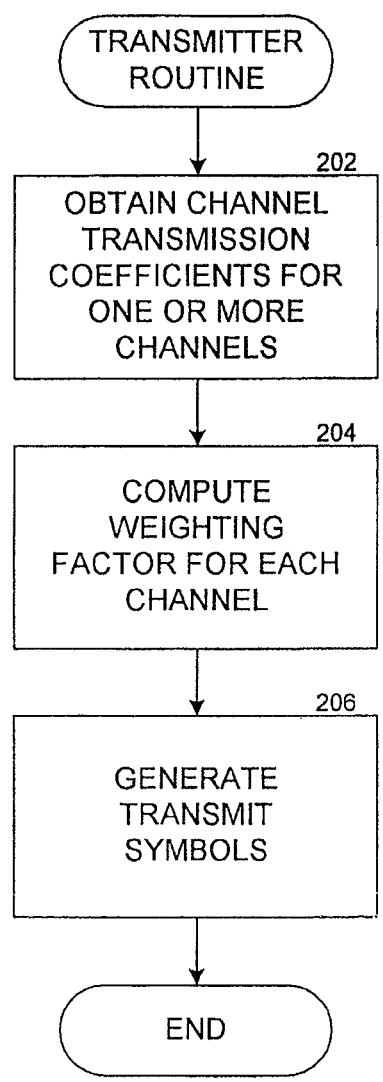
FIG. 2 is a flowchart illustrating a routine performed at the transmitter of FIG. 1.
Figure 3:
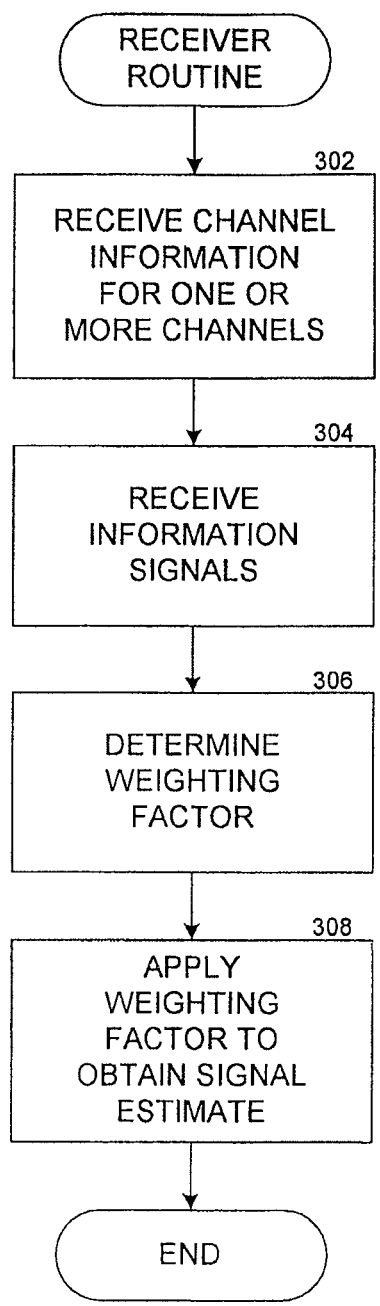
FIG. 3 is a flowchart illustrating a routine performed at the receiver of FIG. 1.

The system model shown in FIG. 1 and also in the routines of FIG. 2 and FIG. 3 is a simple baseband representation. The symbol c to be transmitted is weighted with a transmit weighting vector v to form the transmitted signal vector. The received signal vector, x, is the product of the transmitted signal vector and the channel plus the noise. That is, $$X = Hs + n \quad (2)$$

where the transmitted signals s is given by $$s = [s_1 \ldots s_k]^T = c[v_1 \ldots v_k]^T \quad (3)$$

the channel is represented by $$H = [h_1 \ldots h_k], \quad (4)$$

and the noise signal is expressed as $$n = [n_1 \ldots n_k]^T. \quad (5)$$

The received signals are weighted and summed to produce an estimate, ĉ, of the transmitted symbol c.

In accordance with the principles of this invention and as illustrated in block 204 of FIG. 2, the transmit weighting factor, v, is set to $$v = \frac{1}{a}[h_1 \ldots h_K]^H \quad (6)$$

where the superscript H designates the Hermitian operator, and a is a normalization factor given by $$a = \left(\sum_{k=1}^{K} |h_k|^2\right)^{1/2} \quad (7)$$

is included in the denominator when it is desired to insure that the transmitter outputs the same amount of power regardless of the number of transmitting antennas. Thus, the transmitted signal vector (block 206 of FIG. 2) is $$s = cv = \frac{c}{a}[h_1 \ldots h_K]^H \quad (8)$$

and the signal received at one antenna is $$x = Hs + n = ac + n \quad (9)$$

from which the symbol can be estimated with the SNR of $$\gamma = a^2 \frac{\sigma_c^2}{\sigma_n^2} = a^2 \gamma_0 \quad (10)$$

where $\gamma_0$ denotes the average SNR for the case of a single transmitting antenna (i.e., without diversity). Thus, the gain in the instantaneous SNR is $a^2$ when using multiple transmitting antennas rather than a single transmitting antenna.

The expected value of γ is $$\bar{\gamma} = E[a^2]\gamma_0 = KE\|h_k\|^2\gamma_0 \quad (11)$$

and, hence, the SNR with a $K^{th}$-order transmitting diversity is exactly the same as that with a $K^{th}$-order receiving diversity.

When more than one receiving antenna is employed, the weighting factor, v, is $$v = \frac{1}{a}[gH]^H \quad (12)$$

where $g = [g_1 \ldots g_L]$ (see block 204 of FIG. 2). The transmitted signal vector is then expressed as $$s = \frac{c}{a}[gh]^H \quad (13)$$

The normalization factor, a, is |gH|, which yields $$a = \left(\sum_{p=1}^{L}\sum_{q=1}^{L} g_p g_q^* \sum_{k=1}^{K} h_{pk} h_{qk}^*\right)^{1/2} \quad (14)$$

The received signal vector (block 304 of FIG. 3) is, therefore, given by $$x = \frac{c}{a}H[gH]^H + n \quad (15)$$

When the receiver's weighting factor, w, is set to be g (see blocks 306 and 308 of FIG. 3), the estimate of the received symbol is given by $$\bar{c} = gx = \frac{c}{a}gH[gh]^H + gn = ac + gn \quad (16)$$

with the overall SNR given by $$\gamma = \frac{a^2}{gg^H}\gamma_0 = \frac{a^2 \gamma_0}{\sum_{p=1}^{L}|g_p|^2} \quad (17)$$

From equation (17), it can be observed that the overall SNR is a function of g. Thus, it is possible to maximize the SNR by choosing the appropriate values of g. Since the $h_{qk}$ terms are assumed to be statistically identical, the condition that $|g_1| = |g_2| = \ldots = |g_L|$ has to be satisfied for the maximum value of SNR. Without changing the nature of the problem, one can set $|g_p| = 1$ for simplicity. Therefore the overall SNR is $$\gamma = \frac{a^2}{L}\gamma_0 \quad (18)$$

To maximize γ is equivalent to maximizing a, which is maximized if $$g_p g_q^* = \frac{\sum_{k=1}^{K} h_{pk} h_{qk}^*}{\left|\sum_{k=1}^{K} h_{pk} h_{qk}^*\right|} \quad (19)$$

Therefore, $$a = \left( \sum_{p=1}^{L} \sum_{q=1}^{L} \left| \sum_{k=1}^{K} h_{pk} h_{qk}^* \right| \right)^{1/2} \quad (20)$$

which results in the maximum value of γ. It is clear that the gain in SNR is $$\frac{a^2}{L}$$

when multiple transmitting and receiving antennas are used, as compared to using a single antenna on the transmitting side or the receiving side.

The vector g is determined (block 306 of FIG. 3) by solving the simultaneous equations represented by equation (19). For example, if L=3, equation (19) embodies the following three equations:

$$(g_1 g_2^*) = \frac{\sum_{k=1}^{K} h_{1k} h_{2k}^*}{\left| \sum_{k=1}^{K} h_{1k} h_{3k}^* \right|}, \quad (21)$$

$$(g_1 g_3^*) = \frac{\sum_{k=1}^{K} h_{1k} h_{3k}^*}{\left| \sum_{k=1}^{K} h_{1k} h_{3k}^* \right|}, \text{ and}$$

$$(g_2 g_3^*) = \frac{\sum_{k=1}^{K} h_{2k} h_{3k}^*}{\left| \sum_{k=1}^{K} h_{2k} h_{3k}^* \right|}$$

All of the $h_{pg}$ coefficients are known, so the three equations form a set of three equations and three unknowns, allowing a simple derivation of the $g_1$, $g_2$, and $g_3$ coefficients. The corresponding average SNR is given by $$\bar{\gamma} = E[a^2] \frac{\gamma_0}{L} \quad (22)$$

where the value of $E[a^2]$ depends on the channel characteristics and, in general is bounded by $$LKE[|h_k|^2] \leq E[a^2] \leq \beta L^2 KE[|h_k|^2] \quad (23)$$

What is claimed is:

1. A method comprising:
receiving, via L receive antennas, from K transmit antennas, L received versions of a symbol, c, weighted prior to transmission by a transmit weighting vector proportional to $[gH]^{Hermitian}$, where g is a vector having L components and the superscript Hermitian is the Hermitian operator; and
weighting the L received versions of the symbol, c, by a weighting factor based on g to generate L weighted received versions of the symbol c,
wherein H is a channel estimate matrix having K×L elements $h_{kl}$, corresponding to channels between the K transmit antennas and the L receive antennas,
wherein K is greater than one, and
wherein L is greater than one.

2. The method as recited in claim 1, further comprising:
transmitting, using the K transmit antennas, the symbol, c, weighted by the transmit weighting vector.

3. The method as recited in claim 1, wherein the transmit weighting vector is normalized by a normalization factor, a, equal to $$\left( \sum_{p=1}^{L} \sum_{q=1}^{L} g_p g_q^* \sum_{k=1}^{K} h_{pk} h_{qk}^* \right)^{1/2}.$$

4. The method as recited in claim 1, wherein the transmit weighting vector is normalized by a normalization factor, a, equal to $$\left( \sum_{p=1}^{L} \sum_{q=1}^{L} \left| \sum_{k=1}^{K} h_{pk} h_{qk}^* \right| \right)^{1/2}.$$

5. The method as recited in claim 1, wherein the elements of vector g satisfy $$(g_p g_q^*) = \frac{\sum_{k=1}^{K} h_{pk} h_{qk}^*}{\left| \sum_{k=1}^{K} h_{pk} h_{qk}^* \right|},$$

where p=1, 2, . . . , K and q=1, 2, . . . , L.

6. The method, as recited in claim 1, further comprising:
summing the L weighted, received versions of the symbol c to thereby form an estimated version, ĉ, of the symbol c.

7. The method, as recited in claim 6, wherein an overall signal-to-noise ratio of the estimated version ĉ is set to a maximum value.

8. The method as recited in claim 1, wherein a transmitter coupled to the transmitting antennas outputs the same amount of power regardless of a number of transmit antennas in the K transmit antennas.

* * * * *